(12) United States Patent
Woodward

(10) Patent No.: US 9,374,628 B2
(45) Date of Patent: Jun. 21, 2016

(54) METHODS AND SYSTEMS FOR MANAGING CONSECUTIVE RECORDINGS

(71) Applicant: ECHOSTAR UK HOLDINGS LIMITED, Steeton (GB)

(72) Inventor: Karl Woodward, Crossflatts (GB)

(73) Assignee: ECHOSTAR UK HOLDINGS LIMITED (GB)

( * ) Notice: Subject to any disclaimer, the term of this patent is extended or adjusted under 35 U.S.C. 154(b) by 81 days.

(21) Appl. No.: 14/323,817

(22) Filed: Jul. 3, 2014

(65) Prior Publication Data

US 2016/0007091 A1 Jan. 7, 2016

(51) Int. Cl.
| | | |
|---|---|---|
| *H04N 5/76* | (2006.01) | |
| *H04N 21/6543* | (2011.01) | |
| *H04N 5/781* | (2006.01) | |
| *G11B 27/10* | (2006.01) | |
| *H04N 5/85* | (2006.01) | |
| *H04N 21/41* | (2011.01) | |
| *H04N 21/433* | (2011.01) | |
| *H04N 21/458* | (2011.01) | |
| *H04N 21/4147* | (2011.01) | |
| *H04N 21/472* | (2011.01) | |

(52) U.S. Cl.
CPC .......... *H04N 21/6543* (2013.01); *G11B 27/105* (2013.01); *H04N 5/76* (2013.01); *H04N 5/781* (2013.01); *H04N 5/85* (2013.01); *H04N 21/4135* (2013.01); *H04N 21/4147* (2013.01); *H04N 21/4334* (2013.01); *H04N 21/4583* (2013.01); *H04N 21/47214* (2013.01)

(58) Field of Classification Search
CPC .......... H04N 21/4583; H04N 21/4147; H04N 21/4334; H04N 21/47202; G11B 27/10; G11B 27/005

USPC .......... 386/200, 291, 292, 293, 297, 298, 294
See application file for complete search history.

(56) References Cited

U.S. PATENT DOCUMENTS

| | | | | |
|---|---|---|---|---|
| 6,674,958 B2* | 1/2004 | Wehmeyer | .......... | H04N 7/0887 348/E7.036 |
| 8,752,115 B2* | 6/2014 | Dow | .......... | 386/249 |
| 8,997,153 B2* | 3/2015 | Templeman | .......... | H04N 5/782 725/37 |

(Continued)

OTHER PUBLICATIONS

Author Unknown, "Discover more, A complete guide to your Virgin Media TV powered by TiVo," Virgin Media, 40 pages, online manual http://www.virginmedia.com/tivo/tivo_complete_guide.pdf, Wayback Machine Internet Archive accessed on Jun. 4, 2014.

(Continued)

*Primary Examiner* — Robert Chevalier
(74) *Attorney, Agent, or Firm* — Kilpatrick Townsend & Stockton LLP

(57) ABSTRACT

Various arrangements for managing multiple consecutive recordings by a television receiver are presented. Stored timers may be analyzed by a television receiver. Based on such analysis, a first television program and a second television program that are scheduled to be broadcast in consecutive time slots and are both broadcast as part of a single transponder stream may be identified. The first television program and the second television program may be recorded to a single file stored to a non-transitory computer-readable storage medium of the television receiver. Such a single file may be handled in various ways to reduce the likelihood of any portion of the recording of one of the television programs being missed.

21 Claims, 8 Drawing Sheets

(56) References Cited

U.S. PATENT DOCUMENTS

2007/0188665 A1* 8/2007 Watson ............... H04N 5/4401
 348/731
2010/0158479 A1 6/2010 Craner
2010/0247067 A1 9/2010 Gratton
2011/0197251 A1 8/2011 Kummer
2012/0308200 A1 12/2012 Deluca et al.
2013/0243397 A1 9/2013 Minnick

OTHER PUBLICATIONS

Author Unknown, "Discover TiVo®", my.virginmedia.com, 1 page, Accessed on Jul. 2, 2014, Retrieved from https://my.virginmedia.com/discover/tv/tivo/.
International Search Report and Written Opinion for PCT/GB2015/051786 mailed Sep. 23, 2015, all pages.

* cited by examiner

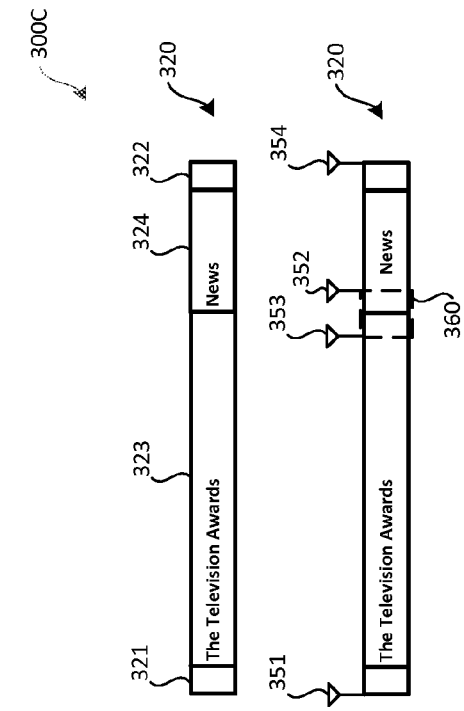
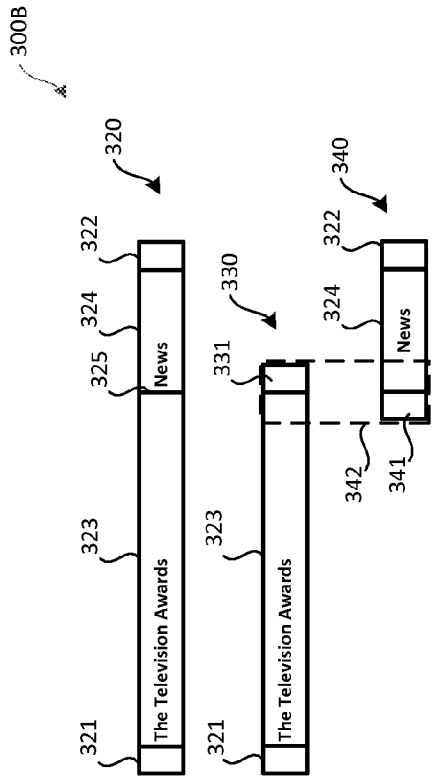
FIG. 3A
FIG. 3B
FIG. 3C

METHODS AND SYSTEMS FOR MANAGING CONSECUTIVE RECORDINGS

BACKGROUND

Recording television programming for later viewing has become a ubiquitous function demanded by many television viewers and performed by many television receivers. At least occasionally, some television viewers may be disappointed to find that their television receivers have handled recording of a television program in a less-than-optimal manner. For instance, if multiple recordings are scheduled consecutively, a first recording may be ended early (resulting in the first recording missing the end of a television program) and/or a second recording may by started late (resulting in the second recording missing the start of a television program). Considering that the start and end of a television program may be especially relevant to the plot of a television program, television viewers may find such undesired performance disruptive to their enjoyment.

SUMMARY

Various systems, methods, computer-readable mediums, and devices (e.g., television receivers) are presented that can be used for managing consecutive recordings of television programs. In some embodiments, a plurality of stored timers may be analyzed, wherein each time of the plurality of stored timers indicates a television program to be recorded on a television channel. Based on analyzing the plurality of stored timers, a first television program and a second television program may be identified that are scheduled to be broadcast in consecutive time slots and are both broadcast as part of a single transponder stream. The first television program and the second television program may be recorded, via a single tuner, to a single file stored to a non-transitory computer-readable storage medium of the television receiver.

Embodiments of such methods, devices, and computer-readable mediums may include one or more of the following features: Two files based on the single file may be created, wherein the first file and the second file comprise a common content segment from the single file. A first set of pointers for the first television program and a second set of pointers for the second television program may be created, wherein: the first set of pointers for the first television program defines a portion of the single file that comprises a common segment and the first television program; and the second set of pointers for the second television program defines a portion of the single file that comprises the common segment and the second television program. The first television program and the second television program may be broadcast consecutively on a single television channel. Prior to recording the second television program, it may be determined that to record the first television program and the second television program, only the single tuner of a plurality of tuners is available for recording, wherein the single file is recorded based on the single tuner of the plurality of tuners being available for recording. A break point may be identified between the first television program and the second television program within the single file based on data related to advertising. Recording the first television program and the second television program to the single file may include: filtering the single transponder stream using a first set of packet filters, wherein the first set of packet filter is associated with a first television channel on which the first television program is broadcast; after filtering the single transponder stream using the first set of packet filters, filtering the single transponder stream using the first set of packet filters and a second set of packet filters, wherein the second set of packet filter is associated with a second television channel on which the second television program is broadcast; and after filtering the single transponder stream using the first and second set of packet filters, filtering the single transponder stream using the second set of packet filters. User input may be received that requests playback of the second television program. The single file may be filtered using the second set of packet filters. The filtered single file may be output for presentation such that the second television program and a common segment is output.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3A illustrates an embodiment of an electronic programming guide (EPG) indicative of multiple television programs being scheduled for recording.

FIG. 3B illustrates an embodiment of two television programs recorded to a single file, then split into separate files having a common segment.

FIG. 3C illustrates an embodiment of two television programs recorded to a single file and marked with pointers having a common segment.

DETAILED DESCRIPTION

Figure 1:
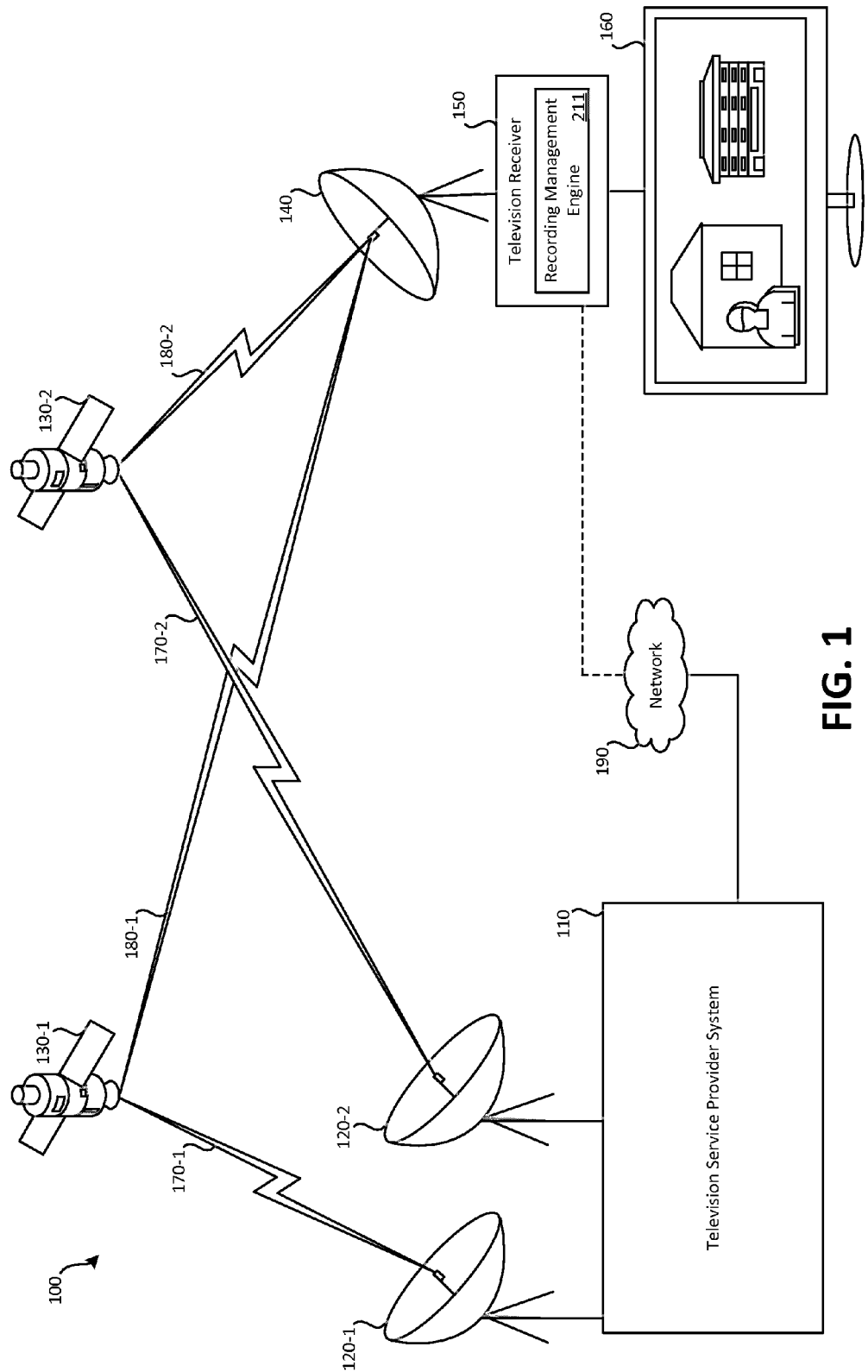
FIG. 1 illustrates an embodiment a satellite television distribution system that includes a television receiver configured to manage the recording of multiple consecutive television programs.

To record television programming, a television receiver (e.g., a set top box) may use digital video recorder (DVR) functionality to record a television program that is broadcast. For example, a first television program may be scheduled for broadcast from 8:00 PM-8:30 PM. While this is the time slot for which the television program is scheduled, the actual broadcast time may differ slightly. For example, the first television program may actually be broadcast from 8:02

PM-8:32 PM or from 7:57 PM-8:27 PM. To accommodate slight variations between the scheduled broadcast time period and the actual broadcast time period, it may be beneficial to record an extended recording window, starting at an earlier time and/or ending at a later time than the scheduled broadcast. For instance, referring to the first television program again, recording may be performed from 7:55 PM-8:35 PM such that if the television program's broadcast begins early and/or ends late the recording will not cut off the beginning and/or end of the television program.

While recording such an expanded window of time around a time slot for which a television program was scheduled may help avoid a portion of the television program inadvertently being cut off from recording, the ability of the television receiver to record multiple television programs consecutively may be adversely affected. For example, the first television program may be scheduled to be broadcast from 8:00 PM-8:30 PM and a second television channel may be scheduled to be broadcast from 8:30 PM-9:00 PM. If the television receiver has sufficient resources, a separate tuner may be used to receive each of the television programs, which may be transmitted on different frequency bands (e.g., transponder streams). However, in some situations, a television receiver may need to use the same tuner to receive both the first and second television programs for recording. Such a situation may occur if the television receiver has a limited number of tuners and/or other tuners of the television receiver are already dedicated to other functions.

When consecutive recording of television programs on the same television channel is performed, using a single tuner for receiving the first and second television program and an extended recording window is recorded for the first television program (for example, from 7:55 PM-8:35 PM), the recording of the second television program may be cut short (for example, from 8:35 PM-9:05 PM) or even entirely skipped from recording. In some situations, the recording of the first television program may be ended early (for example, from 7:55 PM-8:25 PM) to allow the recording of the extended recording window associated with the second television program to occur as scheduled (for example, from 8:25 PM-9:05 PM). None of these arrangements may be preferable.

When using a single tuner to receive consecutively broadcast television programs, it is desirable to ensure that both television programs are fully recorded and, for example, do not require a user to switch among multiple files for complete playback of each television program. For such an arrangement, a period of time, referred to as a common segment, may be associated with each television program. Such a common segment may contain the same content or, at minimum, may have been recorded during the same time period on a same transponder stream. When multiple consecutive television programs are scheduled to be recorded on the same channel or on a same transponder stream based on multiple timers, a single file may be recorded via a single tuner of a television receiver. The single file may then include both television programs. The single file may be scheduled to begin recording an amount of time before the first television program (a lead-in) is scheduled to be broadcast and end an amount of time after the second television program (a lead-out) is scheduled to be broadcast, thus defining an extended recording window to accommodate variations in broadcast time.

From such a single recorded file, two files may be created—one for each television program. These two files that are created may each have a common segment. For example, from the single file, a first file may be created for the first television program that includes 7:55 PM-8:35 PM. For the second television program, a second file may be created for the second television program that includes 8:25 PM-9:05 PM. In this example, the period of time from 8:25 PM-8:35 PM is the common segment and is present in both the first file and the second file. In some embodiments, rather than recording first to a single file, two files may be created during recording, with the common segment being present in each file.

In some embodiments, rather than creating two files, the single recorded file may be maintained. Pointers may be used to define where, within the single file, playback should begin and end for each television program. Again, a common segment may be defined by the pointers such that a portion of the content played back for the first and the second television programs is the same content.

Embodiments detailed herein are applicable to consecutive recordings occurring on the same channel. Embodiments detailed herein may also be applicable to consecutive recordings (and, possibly, overlapping recordings) that occur on different television channels that are broadcast on the same transponder stream. A single tuner may be able to receive a single transponder stream at a given time. The transponder stream may contain multiple television channels. Filters which may be based on packet identifiers (PIDs) may be used to identify packets related to a broadcast of a television program. Therefore the single file may be created, using varying PID filters based on the time. Alternatively, two files may be recorded at least partially at a same time based on packets received via the single tuner.

FIG. 1 illustrates an embodiment of a satellite television distribution system 100 that includes a television receiver configured to manage the recording of multiple consecutive television programs. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 are illustrated, it should be understood that multiple (e.g., tens, thousands, millions) instances of user equipment may receive television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried, using different satellites. Different television channels may also be carried, using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to television receiver 150.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
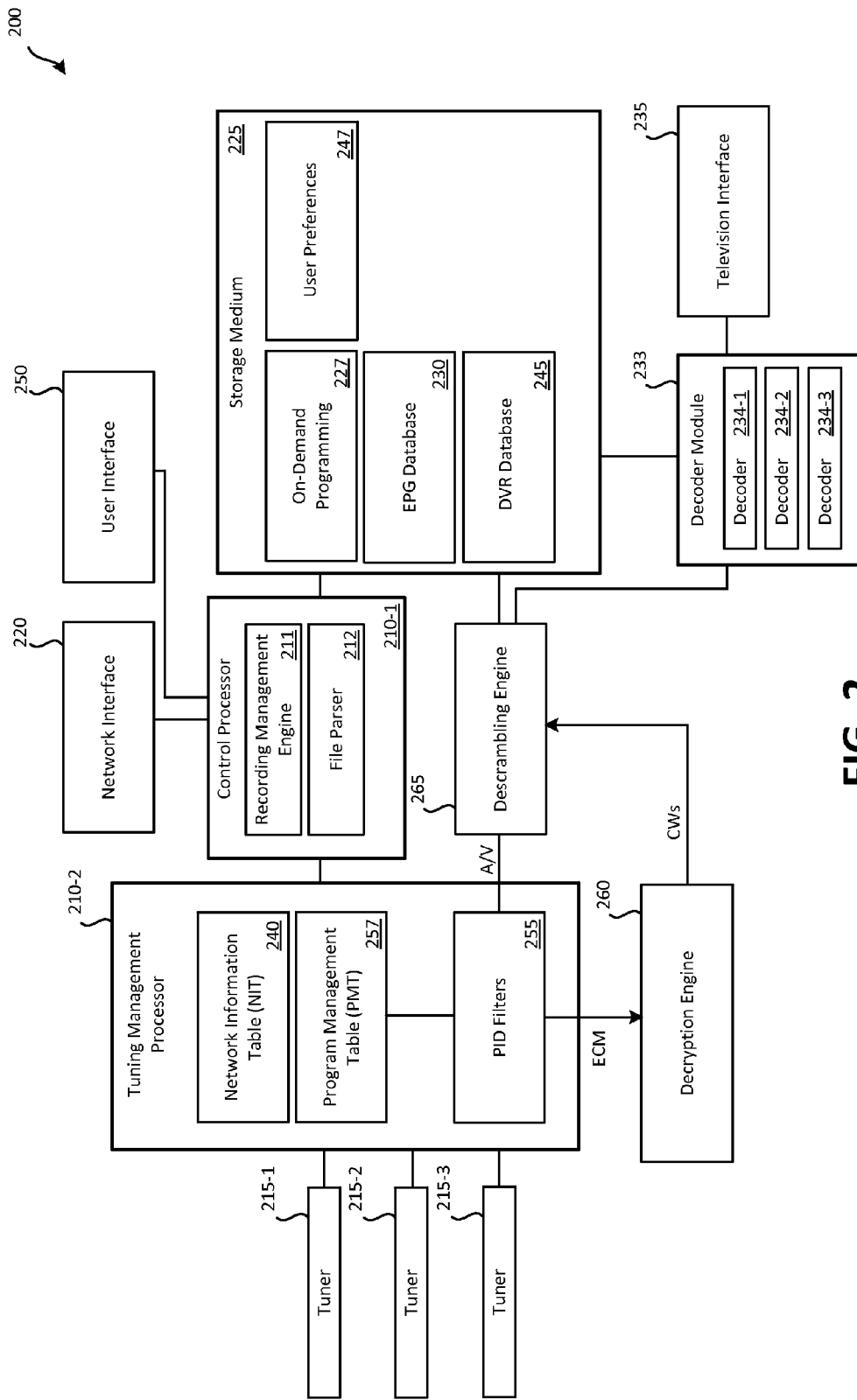
FIG. 2 illustrates an embodiment of a television receiver configured to manage the recording of multiple consecutive television programs.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include STBs and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality, then later outputting the television channel from the storage medium), the television channel may be considered to be viewed "live."

Some or all of satellites 130 may be configured to transmit spot beams. A spot beam may allow a satellite to transmit a transponder stream to a particular geographic region (e.g., to distribute local television channels to the relevant television market). A spot beam is directed to a smaller geographic region than a non-spot beam. For instance, a first transponder that is a spot beam may be directed to provide a transponder stream to the greater-Boston area, while a non-spot beam may be directed to provide another transponder stream to the contiguous forty-eight states. An advantage of a spot beam is that the same frequency may be reused for different geographic areas. For instance, a spot beam at a first frequency directed to the east coast of the United States may be reused to carry different television channels at the same frequency to the west coast. A multiregional signal or multiregional television channel may refer to a signal/television channel that is broadcast to be received in multiple television markets, for instance throughout the eastern time zone of the United States. A regional signal or regional television channel may refer to a spot beam that is targeted to a specific television market. In many instances, spot beams are used to transmit local television channels to a particular television market.

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams via two tuners. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

Television receiver 150 may include a recording management engine 211. Recording management engine may serve to manage recordings made by television receiver 150 based on timers. Such timers may be set by the television service provider and transmitted to television receiver 150 via satellites 130. A user of television receiver 150 may set one or more timers based on an EPG at television receiver 150. Therefore, timers set for recording are based on the scheduled date, time, and television channel for a television program desired to be recorded. When broadcast, the actual broadcast time of the television channel may vary from the scheduled time, such as by being a few minutes earlier or a few minutes later. Additional details related to the functionality of recording management engine 211 are detailed in relation to television receiver 200 of FIG. 2.

FIG. 2 illustrates an embodiment of television receiver 200. Television receiver 200 may be configured to manage the recording of multiple consecutive television programs. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user preferences 247, user interface 250, decryption engine 260, and/or descrambling engine 265. In other embodiments of television receiver 200, fewer or greater numbers of components may be present. It should be understood that the various components of television receiver 200 may be implemented, using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed, using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display, using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220. For instance, instructions (e.g., regarding subscription portability) from a television service provider may also be received via network interface 220, if connected with the Internet. Network interface 220 may be used to provide a confirmation to a television service provider that instructions received from the television service provider have indeed been executed.

Storage medium 225 may represent one or more non-transitory computer-readable storage mediums. Storage medium 225 may include memory and/or a hard drive. Storage medium 225 may be used to store information received from one or more satellites and/or information received via a network interface 220. Storage medium 225 may store information related to EPG database 230, DVR database 245, user preferences 247, and/or on-demand programming 227. Recorded television programs may be stored, using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored, using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control the DVR functionality of television receiver 200, and/or to enable viewing and/or recording of multiple television channels simultaneously. The scheduled programming information stored to EPG database 230 may be used to schedule timers, which define when a television channel is recorded.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT may store data on ECM (entitlement control message) and PIDs for television channels that are transmitted on a transponder frequency.

Based on information in the NIT, it may be possible to determine the proper satellite and transponder to which to tune for a particular television channel. Accordingly, the NIT may be used to determine if two different television channels are on the same transponder stream. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder. While NIT 240 and/or PMT 257 may be stored locally by tuning management processor 210-2, such tables may also be stored using storage medium 225 or some other storage arrangement of television receiver 200.

User preferences 247 define various settings that may be set to a default value by the television service provider, but may possibly be modified by a user of television receiver 200. User preferences 247 may define an amount of time for a lead-in recording and/or lead-out recording (as discussed in relation to FIG. 3B through 3E). Such times may be extended by a user (or the television service provider) in response to the scheduled broadcast time of television programs varying more from the actual broadcast time of the television programs.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to decode only a single television channel at a time. While decoder module 233 is illustrated as having three decoders 234 (decoder 234-1, decoder 234-2, and decoder 234-3), in other embodiments, a greater or fewer number of decoders may be present in television receiver 200.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at television receiver 150 may be received via satellite.

DVR database 245 may be used to store timers (for future recording) and recordings that have been made. DVR database 245 may be configured to use individual files for recordings of television programs and also pointers to files that contain multiple television programs. For instance, if a single file contains multiple television programs, DVR database 245 may for a program contain a pointer to a particular set of PIDs, time (or file size) calculations for the relevant portion of the file, or some other form of metadata that indicates where playback of the television program should begin and end within the file.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file or individual files for each channel. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

Control processor 210-1 may include recording management engine 211 and file parser 212. Recording management engine 211 may control how television programs are recorded to DVR database 245. Recording management engine 211 may trigger the start and stop of recording of television channels in response to timers stored by television receiver 200. Recording management engine 211 may further control recording of multiple television programs (which may be broadcast consecutively on the same or different channels) to a single file or multiple files. Such recording may occur via a single tuner of tuners 215. Recording management engine 211 may perform recording functions as detailed in relation to FIGS. 3B-3E, such as the creation of pointers.

File parser 212 may serve to create multiple files from a single file that was recorded containing multiple television programs. For instance, if a single file was recorded containing multiple consecutive television programs, file parser 212 may create multiple files from the single file, the multiple files having one or more common segments. Further detail regarding the parsing of files is provided in relation to FIGS. 3B and 3D.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming may not be user-selected. As such, the television programming stored to on-demand programming storage 227 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1. In some embodiments, it may be possible to load some or all of preferences to a remote control. As such, the remote control can serve as a backup storage device for the preferences.

Referring back to tuners 215, television channels received via satellite (or cable) may contain at least some scrambled data. Data may also be scrambled for various forms of IP networks and/or over-the-air networks. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 260 to decrypt ECMs. Decryption of an ECM may only be possible if the user has authorization to access the particular television channel associated with the ECM. When an ECM is determined to correspond to a television channel being stored and/or displayed, the ECM may be provided to decryption engine 260 for decryption.

When decryption engine 260 receives an encrypted ECM, decryption engine 260 may decrypt the ECM to obtain some number of control words. In some embodiments, from each ECM received by decryption engine 260, two control words are obtained. Decryption engine 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. As such, control processor 210-1 may instruct tuning management processor 210-2 when a television channel is to be tuned to and/or stored to DVR database 245. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or decryption engine 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

When multiple television programs are to be recorded using a single tuner, it may be possible for the PID filters of PID filters 255 used to record to a single file to be modified during recording. Such an arrangement is detailed in relation to FIG. 3D.

Descrambling engine 265 may use the control words output by decryption engine 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by descrambling engine 265 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 800 of FIG. 8.

FIG. 3A illustrates an embodiment of an EPG 300A indicative of multiple television programs being scheduled for recording. Data for EPG 300A may be received by television receiver 200 from a television service provider and stored using EPG database 230. When output by television receiver 200 (or some other form of television receiver) for display, a user may be presented with a grid similar to EPG 300 of FIG. 3A. EPG 300A presents a listing of various time periods, television channels, and the television programs appearing on those television channels during the indicated time periods. Via EPG 300A, a user may be permitted to select multiple television programs for recording. For exemplary purposes, a user has selected that "The Television Awards" appearing on channel four from 7:30 PM until 9:00 PM be recorded. The user has also selected that "News" appearing on channel four from 9:00 PM until 9:30 PM be recorded. These two recordings are consecutive on a same channel, as indicated by box 310. To set such recordings, timers for each recording are created and stored by the television receiver. The timers may be defined based on the scheduled information stored in the EPG database of television receiver 200. As has been noted, the actual broadcast time of a television program may vary (e.g., by several minutes) from the scheduled broadcast time. Thus, a television receiver may be configured to add some amount of time (e.g., five minutes) to the start and finish of the time period of the timer for recording. The above example is related to a user selecting television programs for recording—it should be understood that the televisions service provider may, in some embodiments, set one or both of the timers at television receiver 200.

FIG. 3B illustrates an embodiment 300B of two television programs recorded to a single file 320 then split into separate files with a common segment. Single file 320 may be recorded based upon the timers set for the consecutive television programs as indicated in FIG. 3A. A determination may be made by the television receiver that a single tuner is available for the recording and/or that the timers for the recordings are consecutive (and, possibly, on the same television channel).

Single file 320, recorded by the television receiver, may include extra time added to the beginning of the recording of single file 320 and end of single file 320 and television programs 323 and 324. Such extra recording time in single file 320 is indicated by lead-in 321 and lead-out 322. The duration of lead-in 321 and lead-out 322 may be defined by the television service provider or by a user preference of the television receiver. Referring to EPG 300 of FIG. 3A, it can be expected that a portion of "Sharks" (the television program scheduled for broadcast on channel four from 7:00 PM until 7:30 PM) and/or a portion of "158 Hours" (the television program scheduled for broadcast on channel four starting at 9:30 PM) may be recorded as part of single file 320. Incidentally recording part of a television program that is not desired to be recorded is likely preferable to not recording part of a desired television program. Such additional recording helps avoid missed portions of the desired programs based on differences between the scheduled and actual broadcast time periods.

From single file 320, two files may be created: file 330 which corresponds to television program 323, and file 340 which corresponds to television program 324. File 330 may be associated with television program 323. Within file 330, lead-in 321 may be stored to accommodate the possibility that television program 323 began broadcasting earlier than the scheduled broadcast time according to EPG 300A. Transition 325 indicates the time at which television program 323 is scheduled to end and television program 324 is scheduled to begin. However, some variance may exist between the scheduled broadcast times and the actual broadcast times, thus lead-out 331 is made part of file 330. Lead-out 331 can be expected to at least partially contain television program 324.

File 340 may be associated with television program 324. Within file 330, lead-out 322 may be stored to accommodate the possibility that television program 324 began broadcasting later than the scheduled broadcast time according to EPG 300A. Transition 325 indicates the time at which television program 323 is scheduled to end and television program 324 is scheduled to begin. However, some variance may exist between the scheduled broadcast times and the actual broadcast times, thus lead-in 341 is made part of file 340. Lead-in 341 can be expected to at least partially contain television program 323.

Lead-in 341 and lead-out 331, collectively, contain the same content since these refer to overlapping portions of single file 320. Therefore, common segment 342 from single file 320 is present within file 330 and file 340. While common segment 342 is duplicitous, such an arrangement may prevent, for example, a user from having to switch from file 330 to file 340 if the broadcast of television program 323 was later than scheduled. Similarly, such an arrangement may prevent, for example, a user from having to switch from file 340 to file 330 if the broadcast of television program 324 began earlier than scheduled. Once files 330 and 340 are created, single file 320 may be deleted.

In some embodiments, single file 320 may be stored for a period of time until metadata is received that indicates the exact time of the individual starts and ends of television programs 323 and 324. This precision metadata may be used to create precise files that do not require significant lead-in and lead-out periods.

FIG. 3C illustrates an embodiment 300C of two television programs recorded to a single file and marked with pointers with a common segment. Single file 320 may contain lead-in 321, television program 323, television program 324, and lead-out 322, similarly to as described in relation to FIG. 3B. Rather than creating two separate files from single file 320, single file 320 may be maintained with pointers being used to indicate where each television program is present within single file 320 for playback.

In some embodiments, metadata may be inserted directly into single file 320 that indicates a start point and end point for each television program. Television program 323 may be defined by start pointer 351 and end pointer 352. Television program 324 may be defined by start pointer 353 and end pointer 354. A common content segment 360 may be present between pointers 353 and 352 (which would be played as part of the playback of each of television programs 323 and 324) to accommodate variances in scheduled broadcast time from actual broadcast time. When playback of either television program 323 or 324 is requested, the television receiver's DVR database may point to single file 320 with an indication to play the segment of single file 320 indicated by the corresponding pointers. In some embodiments, the pointers may be in the form of references stored external from single file 320. For instance, pointers may be in the form of byte counts in single file 320. Therefore, the location indicated by the pointer would be the corresponding bytes into single file 320.

While the embodiments of FIGS. 3A-3C are focused on two consecutive television programs on a single television channel, it should be understood that the principles detailed herein can also be extended to the recording of three or more consecutive television programs on a television channel. Whether two or more consecutive television programs, only a single tuner of the television receiver may be used to receive the television programs.

Figure 3D:
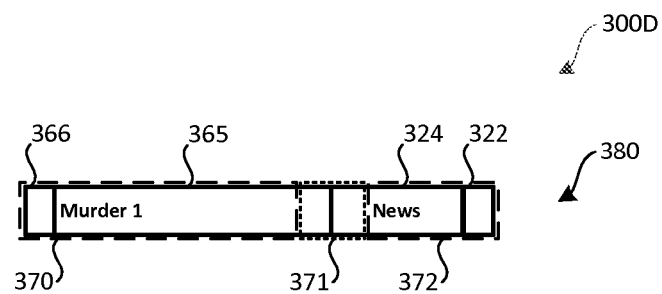
FIG. 3D illustrates an embodiment of two television programs recorded to a single file based on packet identifier (PID) filters.

FIG. 3D illustrates an embodiment 300D of two television programs recorded to a single file based on packet identifier (PID) filters. In embodiment 300D, the two television programs are scheduled for broadcast consecutively on different television channels that are transmitted to the television receiver via a single transponder stream. A single tuner is used by the television receiver to receive the transponder stream. In embodiment 300D, television program 365 is scheduled for broadcast on channel six from 8:00 PM until 9:00 PM; television program 324 is scheduled for broadcast on channel four from 9:00 PM until 9:30 PM. While these television programs are scheduled for broadcast in consecutive time slots, since they are broadcast on different television channels, it is possible television program 324 will begin being broadcast before television program 365 completes being broadcast. As such, it may be desirable to record a common segment, the common segment being common in a time period on the two different television channels.

The recording of embodiment 300D may be performed to single file 380. To record to single file 380, a single tuner of the television receiver may be tuned to the transponder stream that contains both the television channels to be recorded. PID filters (e.g., a PID filter for the audio of channel six, a PID filter for video of channel six, and a PID filter for the associated ECM of channel six) may be configured for recording of television program 365. Such recording may include recording of lead-in 366 on the same channel that television program 365 is broadcast on (e.g., to accommodate the possibility of television program 365 starting to be broadcast before its scheduled time slot). Prior to the scheduled end of television program 365, a common segment 371 may be recorded via the single tuner. For common segment 371, the PID filters used to filter packets for recording to single file 380 may be updated to include filters for both channel six and channel four (on which television program 324 is scheduled to be broadcast. Therefore, the PID filters used to filter packets for recording to single file 380 may include: a PID filter for the audio of channel six, a PID filter for video of channel six, a PID filter for the associated ECM of channel six; a PID filter for the audio of channel four, a PID filter for video of channel four, a PID filter for the associated ECM of channel four (which may or may not be the same ECM as for channel six).

During common segment 371, a lead-out is recorded for television program 365 on channel six (e.g., to accommodate television program 365 running over its scheduled time slot) and a lead-in is recorded for television program 324 on channel four (e.g., to accommodate television program 324 starting to be broadcast before its scheduled time slot). After the recording of common (time) segment 371 is recorded, the PID filters used to record to single file 380 may again be modified to include only PID filters for television program 324: the PID filter for the audio of channel four, the PID filter for video of channel four, and the PID filter for the associated ECM of channel four. After lead-out 322 is recorded on channel four (e.g., to accommodate television program 324 running over its scheduled time slot) recording of single file 380 may be complete.

Once the recording of single file 380 is complete, it may be stored and maintained in the format of a single file. Playback of either television program 365 or television program 324 may be performed by applying the correct PID filters to single file 380. In other embodiments, after recording is complete, PID filters may be applied to single file 380 to parse single file 380 into two files (a first file for television program 365 based on the first set of PIDs and a second file for television program 324 based on the second set of PIDs). In still other embodiments, the television receiver may record directly to two different files based on the PID filters.

Figure 3E:
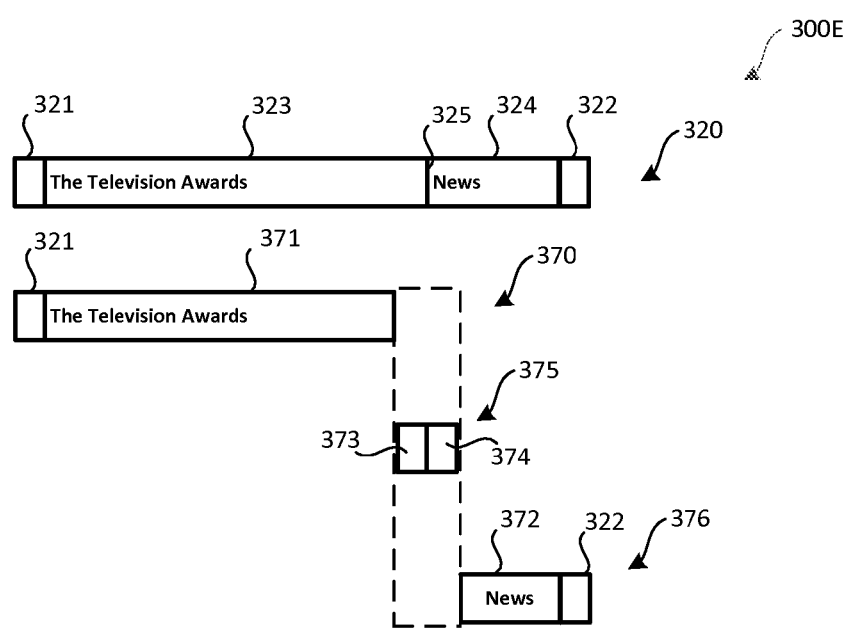
FIG. 3E illustrates an embodiment of two television programs recorded to separate files, with a third file being used to store a common segment.

FIG. 3E illustrates an embodiment 300E of two television programs recorded to separate files, with a third file being used to store a common segment. Single file 320 may be recorded based upon the timers set for the consecutive television programs as indicated in FIG. 3A. A determination may be made by the television receiver that a single tuner is available for the recording and/or that the timers for the recordings are consecutive (and, possibly, on the same television channel). Alternatively, a television receiver may record directly to files 370, 375, and 376 without first recording single file 320.

Single file 320, recorded by the television receiver, may include extra time added to the beginning of the recording of single file 320 and end of single file 320 and television programs 323 and 324. Such extra recording time in single file 320 is indicated by lead-in 321 and lead-out 322. The duration of lead-in 321 and lead-out 322 may be defined by the television service provider or by a user preference of the television receiver. Referring to EPG 300 of FIG. 3A, it can be expected that a portion of "Sharks" (the television program scheduled for broadcast on channel four from 7:00 PM until 7:30 PM) and/or a portion of "158 Hours" (the television program scheduled for broadcast on channel four starting at 9:30 PM) may be recorded as part of single file 320. Incidentally recording part of a television program that is not desired to be recorded is likely preferable to not recording part of a desired television program. Such additional recording helps avoid missed portions of the desired programs based on differences between the scheduled and actual broadcast time periods.

From single file 320, three files may be created in embodiment 300E: file 370 which corresponds to the majority of television program 323 (including lead-in 321), file 376 which corresponds to the majority of television program 324 (including lead-out 322), and common segment file 375, which includes a lead-out for television program 323 and a lead-in for television program 324. File 370 may be associated with television program 323. Within file 370, lead-in 321 may be stored to accommodate the possibility that television program 323 began broadcasting earlier than the scheduled broadcast time according to EPG 300A. Transition 325 indicates the time at which television program 323 is scheduled to end and television program 324 is scheduled to begin. Common segment file 375 may be created based on the time associated with transition 325. For instance, a first number of minutes before and a second number of minutes after transition 325, common segment file 375 may be created. Some variance may exist between the scheduled broadcast times and the actual broadcast times, thus a lead-out 374 of television program 323 and a lead-in 373 of television program 324 is made part of file 375. Lead-out 374 can be expected to at least partially contain television program 324.

File 376 may be associated with television program 324. Within file 376, lead-out 322 may be stored to accommodate the possibility that television program 324 began broadcasting later than the scheduled broadcast time according to EPG 300A. Transition 325 indicates the time at which television program 323 is scheduled to end and television program 324 is scheduled to begin. However, some variance may exist between the scheduled broadcast times and the actual broadcast times, thus lead-in 373 is made part of file 375. Lead-in 373 can be expected to at least partially contain television program 323.

Common segment file 375 may be played back as part of both television programs 323 and 324 during playback. For playback of television program 323, common segment file 375 may be played back following file 375. For playback of television program 324, common segment file 375 may be played back immediately prior to file 376. Using three separate files may have advantages, including that no portion of any of the television program is stored multiple times. Rather, while different portions of the television programs may be broken into different files, none of the stored programming is duplicitous with any other portion of the stored programming. As such, common segment file 375 may be associated with both recordings of television programs 323 and 324. The television receiver may be configured to output for presentation common segment file 375 either before or after the main file associated with a television program based on whether common segment file 375 is used as a lead-in or lead-out.

In some embodiments, single file 320 may be stored for a period of time until metadata is received that indicates the exact time of the individual starts and ends of television programs 323 and 324. This precision metadata may be used to create precise files that do not require significant lead-in and lead-out periods.

Figure 4:
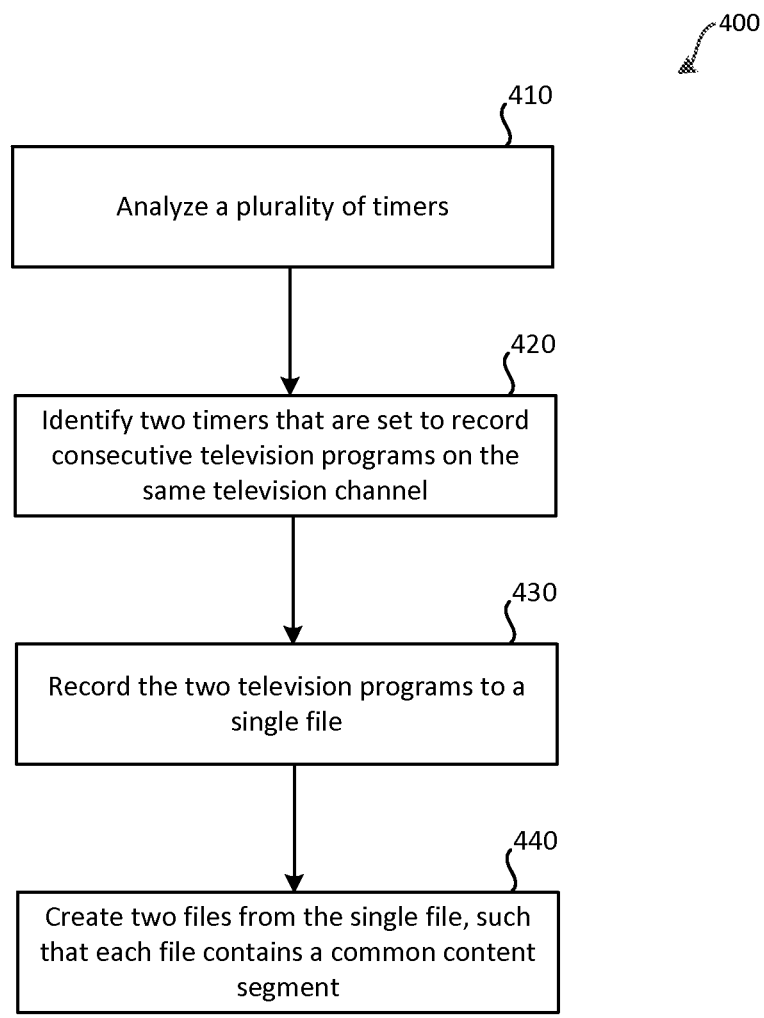
FIG. 4 illustrates an embodiment of a method for managing the recording of multiple consecutive television programs.

Various methods may be performed using the devices and systems described in relations to FIGS. 1-2 and the embodiments detailed in relation to FIGS. 3A-3E. FIG. 4 illustrates an embodiment of a method 400 for managing the recording of multiple consecutive television programs. Each step of method 400 may be performed using a television receiver, such as television receiver 200 of FIG. 2. Such a television receiver may be functioning as part of a satellite television distribution system, such as satellite television distribution system 100 of FIG. 1. Alternatively, such a television receiver may be functioning as part of another form of television distribution network, such as an over-the-air broadcast network, a cable network, a multicast type IP network, or, more generally, an IP-based network.

At step 410, a plurality of timers stored by the television receiver may be analyzed. For instance, all timers that are scheduled to run for a given day may be analyzed. These timers may have been set by a user, by the television service provider, or some combination thereof. In some embodiments, the analysis of step 410 may only be performed if a single tuner is available for recording. If multiple tuners are available, method 400 may not be necessary. However, if multiple tuners are available, but it is desirable to only devote one tuner to recording, method 400 may be used. The analysis of step 410 may determine what channels timers are associated with and what timeslots the timers are scheduled to record.

At step 420, based on the analysis of step 410, two timers that are configured to record television programs that are scheduled consecutively on the same television channel may be determined. Consecutive scheduled television programs may not have any other scheduled content (besides commercials) appearing between the two television programs. For instance, referring to FIG. 3A, "The Television Awards" and "News" are consecutive television programs appearing on the same television channel, while "Crime Scene PI" and "Paid Programming" are not.

At step 430, based on the identification of step 420, the two television programs may be recorded to a single file. The television receiver may have tuned to the appropriate transponder stream via a single tuner. As such, a single file is created and stored by the television receiver. This single file would cover the time period indicated by both items identified at step 420. Additionally a lead-in and/or lead-out may be added to the start and/or end time of the combined recording periods of the two timers. For instance, referring to FIG. 3B, single file 320 may be recorded based on timers for television program 323 and television program 324.

At step 440, two files may be created from the single file of step 430. The first file may be associated with the first television program and the second file may be associated with the second television program. Each of the two files may contain a common content segment. As such, a portion of common content from the first file may copied to the two files. Referring to FIG. 3B, the common content segment in the two files may include the lead-in section of the second television program and the lead-out section of the first television program. Accordingly, the first file for the first television program may contain a portion of the second television program and the second file for the second television program may contain a portion of the first television program. Once the two files have been created from the single file, the single file may be deleted. References in the television receiver's DVR database may be updated to refer to the individual files for the television programs. Method 400 may also be used to create three files in accordance with FIG. 3E.

In some embodiments, rather than recording the single file then creating the two files from the single file, the two files may be created directly during recording. The common content segment may be recorded to each of the two files.

In some embodiments, two files may be created, but no common content segment may be present. Rather, a pointer may be used to direct playback to the start of the second file when the first file completes. As such, a portion of the content would not need to be stored in both files. For instance, referring to FIG. 3B, when television program 323 completes playback, rather than lead-out 331 being present in file 330, a portion of television program 324 may be played as the lead-out (e.g., the first 5 minutes of television program 324, or some other length of time). Similarly, an ending portion of television program 323 of file 330 may be played as the lead-in for television program 324 of file 340.

While the embodiments of method 400 focus on two television programs being recorded consecutively, it should be understood that such embodiments can be expanded to record three or more consecutive television programs using a single tuner. Between each consecutive television program, a common content segment may be present.

Figure 5:
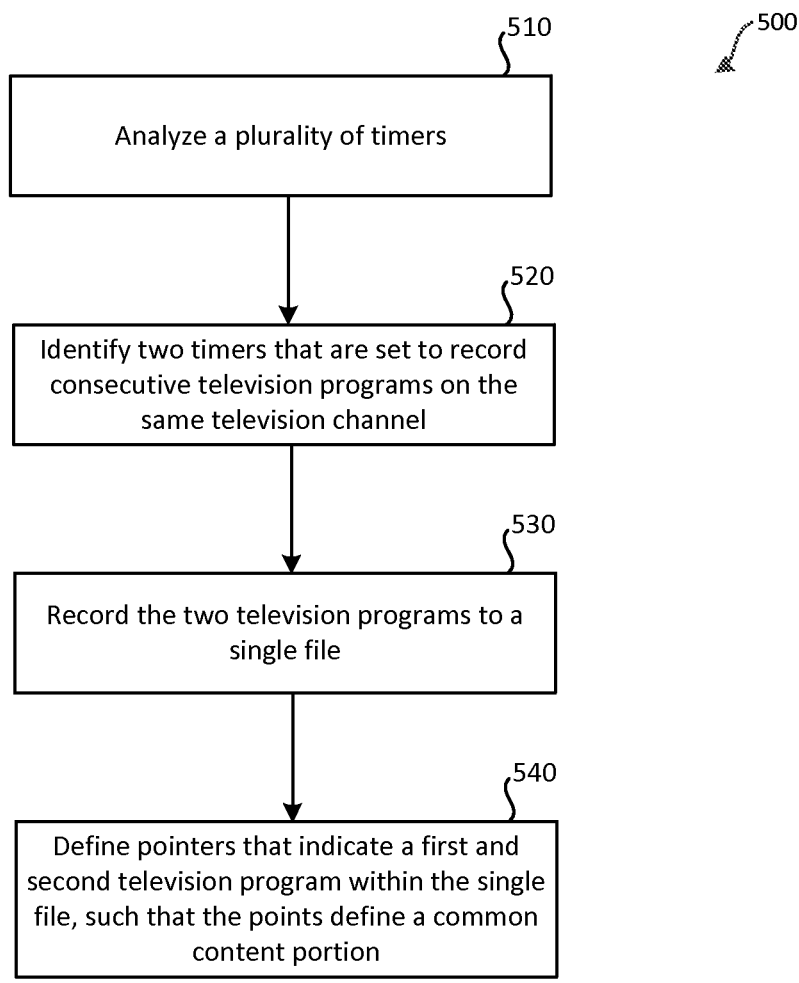
FIG. 5 illustrates another embodiment of a method for managing the recording of multiple consecutive television programs.

FIG. 5 illustrates another embodiment of a method for managing the recording of multiple consecutive television programs. Each step of method 500 may be performed using a television receiver, such as television receiver 200 of FIG. 2. Such a television receiver may be functioning as part of a satellite television distribution system, such as satellite television distribution system 100 of FIG. 1. Alternatively, such a television receiver may be functioning as part of another form of television distribution network, such as an over-the-air broadcast network, a cable network, or an IP-based network. In method 500, steps 510 through 530 may be performed in a substantially similar fashion to steps 410 through 430.

At step 540, the single file may be maintained, but pointers may be defined that indicate where playback should begin and end within the single file for the first television program and the second television, respectively. Referring to FIG. 3C, start pointers may be used to define where playback of each television program should begin (including a lead-in) and end pointers may define where playback of each television program should end (including a lead-out). For the first television program in the single file, the start pointer may be indicated by the start of the file and for the last television program in the single file, the end pointer may be indicated by the end of the file.

As an example, referring to FIG. 3C, start pointer 353 for the second television program (television program 324) may be present in single file 320 before end pointer 352 for the first television program (television program 323), thus defining a common content segment that is output for presentation during playback of both television programs.

The pointers may be in the form of metadata added to single file 320 during the recording of step 530. For instance, based on the scheduled time of the television programs indicated in the EPG database of the television receiver and the predefined period of time for lead-ins and lead-outs, the location of start and end pointers within the single file can be calculated and inserted in the form of metadata. In some embodiments, rather than inserting metadata, during recording, at the determined locations, a file size measurement is made and recorded to a table stored in a separate file from the single file. Each file size measurement, which can then be used as a location within the file, can be used as pointers to locate each television program with a lead-in and lead-out for playback.

The DVR database of the television receiver may have entries for each of the two television programs. Each entry may refer to the single file and may refer to the appropriate pointers that define the start and end of playback for each television program. Accordingly, while the single file contains two (or more) television programs, only the requested television program is played back (with the associated lead-in and lead-out).

While the embodiments of method 500 focus on two television programs being recorded consecutively, it should be understood that such embodiments can be expanded to record three or more consecutive television programs using a single tuner to a single file, with each television program being defined by pointers. Between each consecutive television program, a common content segment may be present.

Figure 6:
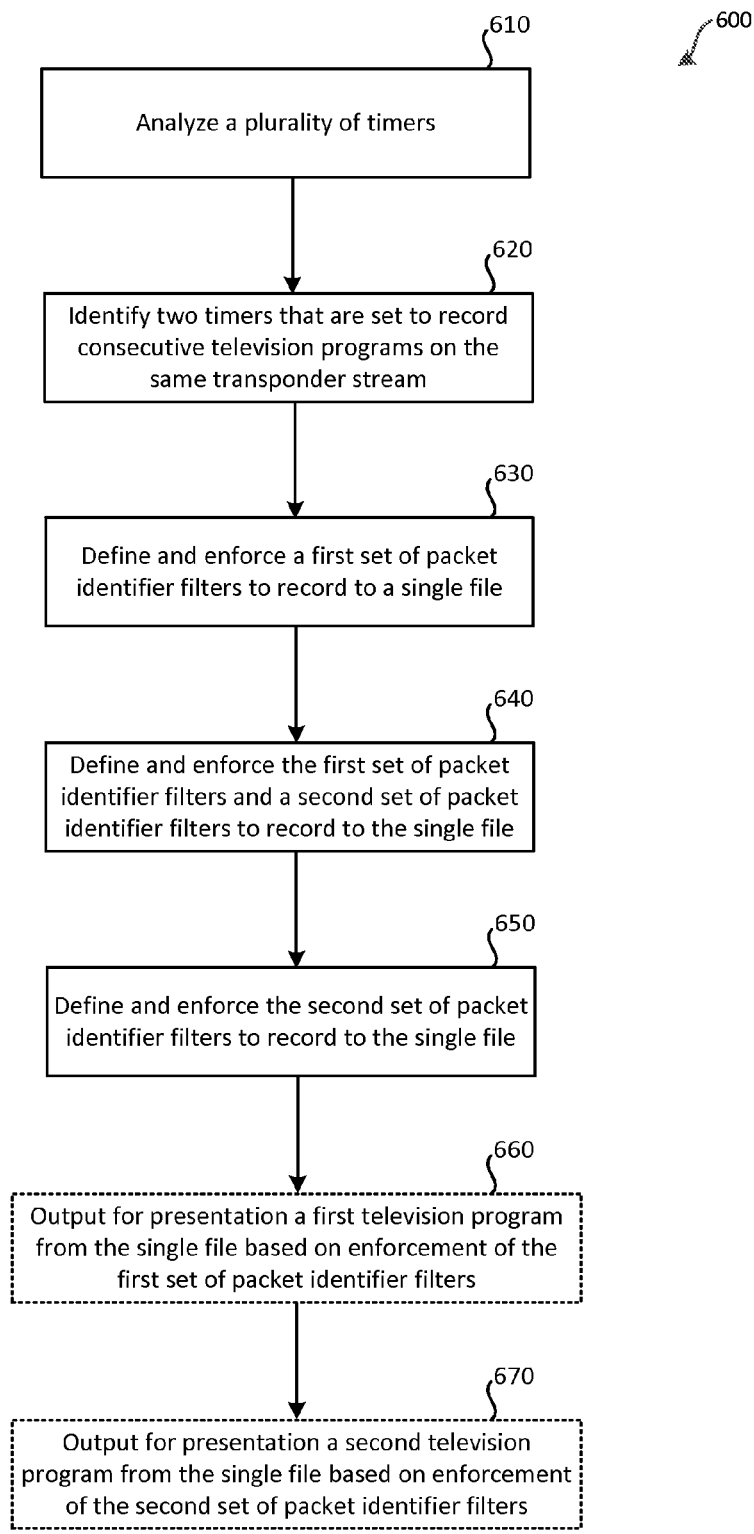
FIG. 6 illustrates another embodiment of a method for managing the recording of multiple television programs using packet filters.

FIG. 6 illustrates an embodiment of a method for managing the recording of multiple television programs using packet identifier (PID) filters. The television programs recorded according to method 600 may occur on the same television channel consecutively or may be broadcast on different television channels that are received as part of a single transponder stream by a single tuner of the television receiver. It may be possible that due to variances in scheduling, the two (or more) television programs may partially overlap in broadcast. Each step of method 600 may be performed using a television receiver, such as television receiver 200 of FIG. 2. Such a television receiver may be functioning as part of a satellite television distribution system, such as satellite television distribution system 100 of FIG. 1. Alternatively, such a television receiver may functioning as part of another form of television distribution network, such as an over-the-air broadcast network, a cable network, or an IP-based network.

At step 610, a plurality of timers stored by the television receiver may be analyzed. For instance, all timers that are scheduled to run for a given day may be analyzed. These timers may have been set by a user, by the television service provider, or some combination thereof. In some embodiments, the analysis of step 610 may only be performed if a single tuner is available for recording. If multiple tuners are available, method 600 may not be necessary. However, if multiple tuners are available, but it is desirable to only devote one tuner to recording, method 600 may be used. The analysis of step 610 may determine what channels timers are associated with, are some of these television channels on the same transponder stream (e.g., according to the stored tables of the television receiver) and what timeslots the timers are scheduled to record.

At step 620, based on the analysis of step 610, two timers that are configured to record television programs that are scheduled consecutively on the same transponder stream, or, more specifically, the same television channel, may be determined. In some embodiments, the television programs need not be consecutive in scheduled time slots, but may have overlapping time slots. For example, referring to FIG. 3A, television programs "Sports Highlights," which is scheduled for broadcast from 8:00 PM until 9:30 PM on television channel 3 overlaps with "The Television Awards" which is scheduled for broadcast from 7:30 PM until 9:00 PM on television channel 4. These programs overlap for an hour and could be recorded according to method 600 using a single tuner.

At step 630, a first set of PID filters are used to record packets to a single file. The PID filters may include filters for an audio stream of the television channel associated with the television program to be recorded, a video stream of the television channel associated with the television program to be recorded, and/or an ECM stream of the television channel associated with the television program to be recorded. Referring, for example, to FIG. 3D, if television program 365 is to be recorded, which according to FIG. 3A appears on channel 6, PID filters may be enforced by the television receiver for the video, audio, and ECM streams of channel 6 during the scheduled broadcast period of time for television program 365, plus a lead-in and lead-out time.

At step 640, the first set of PID filters and a second set of PID filters are used to record packets to the single file. When step 640 begins may be contingent on the scheduled start time of the broadcast of the second television program to be recorded, plus a lead-in time (thus causing recording to begin earlier than the scheduled broadcast time). The PID filters that are active may include the first set of PID filters plus a second set of PID filters for an audio stream of the television channel associated with the second television program to be recorded, a video stream of the television channel associated with the second television program to be recorded, and/or an ECM stream of the second television channel associated with the television program to be recorded. In some embodiments, only a single ECM stream is used for both television channels; thus, only one ECM stream is recorded for the two television channels on the same transponder stream. Referring, for example, to FIG. 3D, if television program 365 is to be recorded and television program 324 is to be recorded, which according to FIG. 3A appears on channel 4, PID filters may be enforced by the television receiver for the video, audio, and ECM streams of channels 4 and 6 during recording of the common (time) segment. During this common time segment, packets for both television programs are stored to the single file; this common time segment includes a lead-out for the first program completing recording and a lead-in for the second television program beginning recording.

At step 650, the second set of PID filters are used to record packets to the single file. The first set of PID filters are no longer used for recording once the lead-out for the first television program has been recorded. Referring, for example, to FIG. 3D, if television program 324 is to be recorded, which according to FIG. 3A appears on channel 4, the second set of PID filters may be enforced by the television receiver for the video, audio, and ECM streams of channel 4 during the scheduled broadcast period of time for television program 324, plus a lead-in and lead-out time. Following step 650, recording of the single file may be completed.

The DVR database of the television receiver may have entries for each of the two television programs. Each entry may refer to the single file and may refer to the appropriate PID filters that should be used to extract the correct packets from the single file Accordingly, while the single file contains two (or more) television programs, only the requested television program is played back (with the associated lead-in and lead-out) based on the correct PID filters being applied to playback of the single file. At step 660, output for presentation of the first television program may be performed by accessing the single file and filtering the single file according to the first set of PID filters. At step 670, output for presentation of the second television program may be performed by accessing the single file and filtering the single file according to the second set of PID filters.

While the embodiments of method 600 focus on two television programs being recorded consecutively, it should be understood that such embodiments can be expanded to record three or more television programs received via a single transponder stream using a single tuner to a single file, with each television program being defined by the PID filters used for recording.

In some embodiments of method 600, rather than a single file being created with PID filters for multiple television channels being applied, separate files may be created for each television channel. Therefore, the first set of PID filters may be used to record to a first file while the second set of PID filters may be used to record to a second file. In some embodiments, a single file is created, but, similar to as detailed in relation to method 400, two files are created from the single file after recording has been completed.

The methodologies of methods 400, 500, and 600 may be combined to a degree. For instance if three television programs are to be recorded, with two of the television programs being consecutive on a television channel and a third appearing on another television channel on the same transponder stream, all of these television programs may be recorded using a single tuner of the television receiver. A single file may be created. The third television program may be identified within the single file by filtering based on PID filters as detailed in method 600. If the other two television programs appeared on the same television channel (and thus may use at least some of the same PID filters), pointers (as detailed in relation to method 500) may be used to identify and extract the appropriate television program for playback.

Method 600 may be adapted to allow for all (or a subset of) television channels on a given transponder stream to be recorded and stored for a period of time. For instance, a single file may be created for all television channels on a given transponder, recorded via a single tuner. The file may be maintained in a first-in, first-out manner such that a rolling window of a predefined length of time is available for all television channels on the transponder. Therefore, whenever a user changes television channel within the transponder stream, the user may be able to rewind up to the predefined length of time, such as five minutes. The predefined length of time may be governed by the amount of space of the television receiver's storage medium dedicated to storage of the file (e.g., the longer the predefined period of time, the larger the file size). For example, referring to FIG. 3A, if a user is watching baseball on channel 3 and this television show completes its actual broadcast at 8:02 PM, the user may change to channel five to watch "Boats" and not miss the beginning, even if the actual broadcast of "Boats" began at 7:57 PM (assuming the predefined length of time is at least five minutes. Such an arrangement may be completed using a single tuner and the maintenance of a single file (or multiple files) in accordance with method 600. If multiple tuners are available at the television receiver, such a file or files may be maintained for multiple transponder streams.

Figure 7:
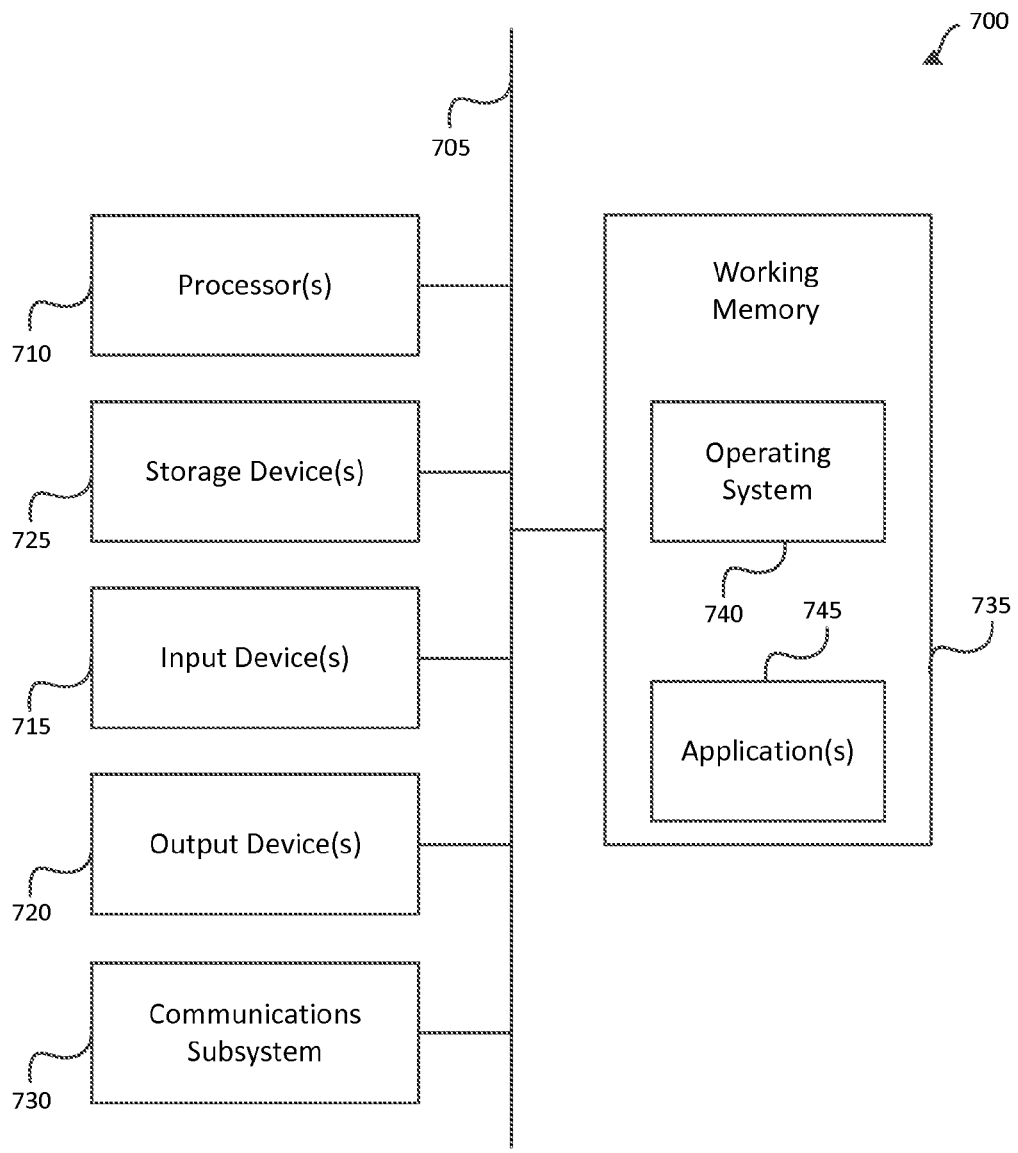
FIG. 7 illustrates an embodiment of a computer system.

A computer system as illustrated in FIG. 7 may be incorporated as part of the previously described computerized devices, such as the television receivers and television service provider system. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for managing multiple consecutive recordings by a television receiver, the method comprising:
    analyzing, by the television receiver, a plurality of stored timers, wherein each time of the plurality of stored timers indicates a television program to be recorded on a television channel;
    based on analyzing the plurality of stored timers, identifying, by the television receiver, a first television program and a second television program that are scheduled to be broadcast in consecutive time slots and are both broadcast as part of a single transponder stream;
    recording, by the television receiver, via a single tuner, the first television program and the second television program to a single file stored to a non-transitory computer-readable storage medium of the television receiver; and
    creating, by the television receiver, a first file and a second file based on the single file, wherein the first file and the second file comprise a common content segment from the single file.

2. The method for managing multiple consecutive recordings by the television receiver of claim 1, wherein the first television program and the second television program are broadcast consecutively on a single television channel.

3. The method for managing multiple consecutive recordings by the television receiver of claim 1, further comprising:
prior to recording the second television program, determining, by the television receiver, that to record the first television program and the second television program, only the single tuner of a plurality of tuners is available for recording, wherein the single file is recorded based on the single tuner of the plurality of tuners being available for recording.

4. The method for managing multiple consecutive recordings by the television receiver of claim 1, further comprising:
identifying, by the television receiver, a break point between the first television program and the second television program within the single file based on data related to advertising.

5. A system for managing multiple consecutive recordings by a television receiver, the system comprising:
a tuner;
one or more processors; and
a memory communicatively coupled with and readable by the one or more processors and having stored therein processor-readable instructions which, when executed by the one or more processors, cause the one or more processors to:
analyze a plurality of stored timers, wherein each time of the plurality of stored timers indicates a television program to be recorded on a television channel;
based on analyzing the plurality of stored timers, identify a first television program and a second television program that are scheduled to be broadcast in consecutive time slots and are both broadcast as part of a single transponder stream;
record, via the tuner, the first television program and the second television program to a single file stored to a non-transitory computer-readable storage medium of the television receiver; and
create a first file and a second file based on the single file, wherein the first file and the second file comprise a common content segment from the single file.

6. The system for managing multiple consecutive recordings by the television receiver of claim 5, wherein the processor-readable instructions, when executed, further cause the one or more processors to:
prior to recording the second television program, determine that to record the first television program and the second television program, only the tuner of a plurality of tuners is available for recording, wherein the single file is recorded based on the tuner of the plurality of tuners being available for recording.

7. The system for managing multiple consecutive recordings by the television receiver of claim 5, wherein the processor-readable instructions, when executed, further cause the one or more processors to:
identify a break point between the first television program and the second television program within the single file based on data related to advertising.

8. A non-transitory processor-readable medium for managing multiple consecutive recordings, comprising processor-readable instructions configured to cause one or more processors to:
analyze a plurality of stored timers, wherein each time of the plurality of stored timers indicates a television program to be recorded on a television channel;
based on analyzing the plurality of stored timers, identify a first television program and a second television program that are scheduled to be broadcast in consecutive time slots and are both broadcast as part of a single transponder stream;
record, via a single tuner, the first television program and the second television program to a single file; and
create a first file and a second file based on the single file, wherein the first file and the second file comprise a common content segment from the single file.

9. The non-transitory processor-readable medium for managing multiple consecutive recordings of claim 8, wherein the processor-readable instructions, when executed, further cause the one or more processors to:
prior to recording the second television program, determine that to record the first television program and the second television program, only the single tuner of a plurality of tuners is available for recording, wherein the single file is recorded based on the single tuner of the plurality of tuners being available for recording.

10. A method for managing multiple consecutive recordings by a television receiver, the method comprising:
analyzing, by the television receiver, a plurality of stored timers, wherein each time of the plurality of stored timers indicates a television program to be recorded on a television channel;
based on analyzing the plurality of stored timers, identifying, by the television receiver, a first television program and a second television program that are scheduled to be broadcast in consecutive time slots and are both broadcast as part of a single transponder stream;
recording, by the television receiver, via a single tuner, the first television program and the second television program to a single file stored to a non-transitory computer-readable storage medium of the television receiver; and
creating, by the television receiver, a first set of pointers for the first television program and a second set of pointers for the second television program, wherein:
the first set of pointers for the first television program defines a first portion of the single file that comprises a common segment and the first television program; and
the second set of pointers for the second television program defines a second portion of the single file that comprises the common segment and the second television program.

11. A method for managing multiple consecutive recordings by a television receiver, the method comprising:
analyzing, by the television receiver, a plurality of stored timers, wherein each time of the plurality of stored timers indicates a television program to be recorded on a television channel;
based on analyzing the plurality of stored timers, identifying, by the television receiver, a first television program and a second television program that are scheduled to be broadcast in consecutive time slots and are both broadcast as part of a single transponder stream;
recording, by the television receiver, via a single tuner, the first television program and the second television program to a single file stored to a non-transitory computer-readable storage medium of the television receiver, wherein recording the first television program and the second television program to the single file comprises:
filtering, by the television receiver, the single transponder stream using only a first set of packet filters, wherein the first set of packet filters is associated with a first television channel on which the first television program is broadcast;

after filtering the single transponder stream using the first set of packet filters, filtering, by the television receiver, the single transponder stream using the first set of packet filters and a second set of packet filters, wherein the second set of packet filters is associated with a second television channel on which the second television program is broadcast; and after filtering the single transponder stream using the first and second set of packet filters, filtering, by the television receiver, the single transponder stream using only the second set of packet filters.

12. The method for managing multiple consecutive recordings by the television receiver of claim 11, the method further comprising:

receiving, by the television receiver, user input requesting playback of the second television program;

filtering, by the television receiver, the single file using the second set of packet filters; and outputting, by the television receiver, for presentation the filtered single file such that the second television program and a common segment is output, wherein the common segment corresponds to the portion of the single transponder stream filtered using both the first set of packet filters and the second set of packet filters.

13. The method for managing multiple consecutive recordings by the television receiver of claim 11, the method further comprising:

receiving, by the television receiver, user input requesting playback of the first television program;

filtering, by the television receiver, the single file using the first set of packet filters; and outputting, by the television receiver, for presentation the filtered single file such that the first television program and a common segment is output, wherein the common segment corresponds to the portion of the single transponder stream filtered using both the first set of packet filters and the second set of packet filters.

14. A system for managing multiple consecutive recordings by a television receiver, the system comprising:

a tuner;

one or more processors; and a memory communicatively coupled with and readable by the one or more processors and having stored therein processor-readable instructions which, when executed by the one or more processors, cause the one or more processors to:

analyze a plurality of stored timers, wherein each time of the plurality of stored timers indicates a television program to be recorded on a television channel;

based on analyzing the plurality of stored timers, identify a first television program and a second television program that are scheduled to be broadcast in consecutive time slots and are both broadcast as part of a single transponder stream;

record, via the tuner, the first television program and the second television program to a single file stored to a non-transitory computer-readable storage medium of the television receiver; and create a first set of pointers for the first television program and a second set of pointers for the second television program, wherein:

the first set of pointers for the first television program defines a first portion of the single file that comprises a common segment and the first television program; and the second set of pointers for the second television program defines a second portion of the single file that comprises the common segment and the second television program.

15. A system for managing multiple consecutive recordings by a television receiver, the system comprising:

a tuner;

one or more processors; and a memory communicatively coupled with and readable by the one or more processors and having stored therein processor-readable instructions which, when executed by the one or more processors, cause the one or more processors to:

analyze a plurality of stored timers, wherein each time of the plurality of stored timers indicates a television program to be recorded on a television channel;

based on analyzing the plurality of stored timers, identify a first television program and a second television program that are scheduled to be broadcast in consecutive time slots and are both broadcast as part of a single transponder stream; and record the first television program and the second television program to a single file stored to a non-transitory computer-readable storage medium of the television receiver, wherein recording the first television program and the second television program to the single file comprises causing the one or more processors to:

filter the single transponder stream using a first set of packet filters, wherein the first set of packet filters is associated with a first television channel on which the first television program is broadcast;

after filtering the single transponder stream using the first set of packet filters, filter the single transponder stream using the first set of packet filters and a second set of packet filters, wherein the second set of packet filters is associated with a second television channel on which the second television program is broadcast; and after filtering the single transponder stream using the first and second set of packet filters, filter the single transponder stream using the second set of packet filters.

16. The system for managing multiple consecutive recordings by the television receiver of claim 15, wherein the processor-readable instructions, when executed, further cause the one or more processors to:

receive user input requesting playback of the second television program;

filter the single file using the second set of packet filters; and output for presentation the filtered single file such that the second television program and a common segment is output, wherein the common segment corresponds to the portion of the single transponder stream filtered using both the first set of packet filters and the second set of packet filters.

17. The system for managing multiple consecutive recordings by the television receiver of claim 16, wherein the processor-readable instructions, when executed, further cause the one or more processors to:

receive user input requesting playback of the first television program;

filter the single file using the first set of packet filters; and output for presentation the filtered single file such that the first television program and the common segment is output.

18. A non-transitory processor-readable medium for managing multiple consecutive recordings, comprising processor-readable instructions configured to cause one or more processors to:
- analyze a plurality of stored timers, wherein each time of the plurality of stored timers indicates a television program to be recorded on a television channel;
- based on analyzing the plurality of stored timers, identify a first television program and a second television program that are scheduled to be broadcast in consecutive time slots and are both broadcast as part of a single transponder stream;
- record, via a single tuner, the first television program and the second television program to a single file; and
- create a first set of pointers for the first television program and a second set of pointers for the second television program, wherein:
  - the first set of pointers for the first television program defines a first portion of the single file that comprises a common segment and the first television program; and
  - the second set of pointers for the second television program defines a second portion of the single file that comprises the common segment and the second television program.

19. A non-transitory processor-readable medium for managing multiple consecutive recordings, comprising processor-readable instructions configured to cause one or more processors to:
- analyze a plurality of stored timers, wherein each time of the plurality of stored timers indicates a television program to be recorded on a television channel;
- based on analyzing the plurality of stored timers, identify a first television program and a second television program that are scheduled to be broadcast in consecutive time slots and are both broadcast as part of a single transponder stream;
- record, via a single tuner, the first television program and the second television program to a single file, which comprises causing the one or more processors to:
  - filter the single transponder stream using only a first set of packet filters, wherein the first set of packet filters is associated with a first television channel on which the first television program is broadcast;
  - after filtering the single transponder stream using the first set of packet filters, filter the single transponder stream using the first set of packet filters and a second set of packet filters, wherein the second set of packet filters is associated with a second television channel on which the second television program is broadcast; and
  - after filtering the single transponder stream using the first and second set of packet filters, filter the single transponder stream using only the second set of packet filters.

20. The non-transitory processor-readable medium of claim 19, wherein the processor-readable instructions further comprise processor-readable instructions configured to cause the one or more processors to:
- receive user input requesting playback of the second television program;
- filter the single file using the second set of packet filters; and
- output for presentation the filtered single file such that the second television program and a common segment is output, wherein the common segment corresponds to the portion of the single transponder stream filtered using both the first set of packet filters and the second set of packet filters.

21. The non-transitory processor-readable medium of claim 19, wherein the processor-readable instructions further comprise processor-readable instructions configured to cause the one or more processors to:
- receive user input requesting playback of the first television program;
- filter the single file using the first set of packet filters; and
- output for presentation the filtered single file such that the first television program and a common segment is output, wherein the common segment corresponds to the portion of the single transponder stream filtered using both the first set of packet filters and the second set of packet filters.

* * * * *